Patented Jan. 8, 1924.

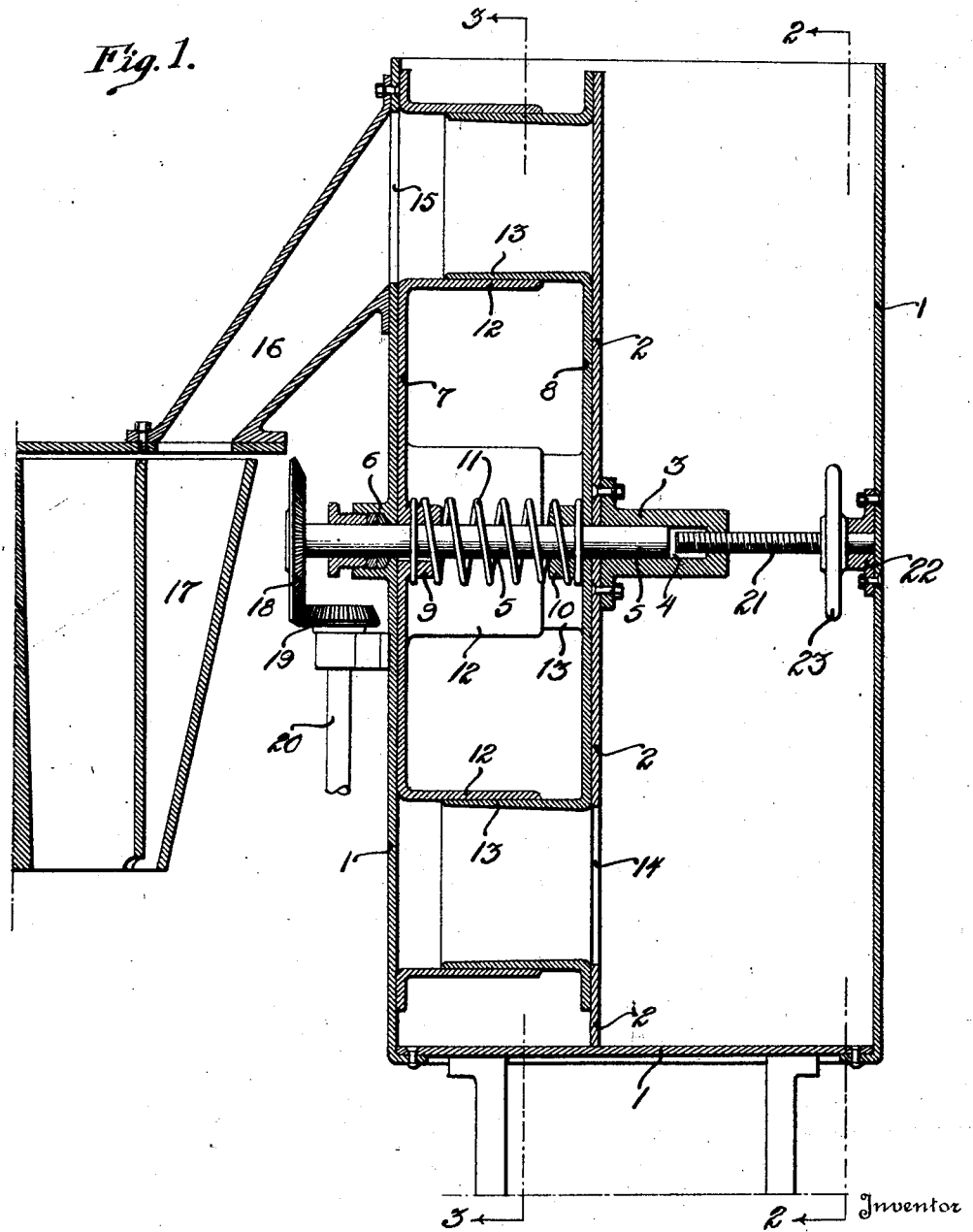

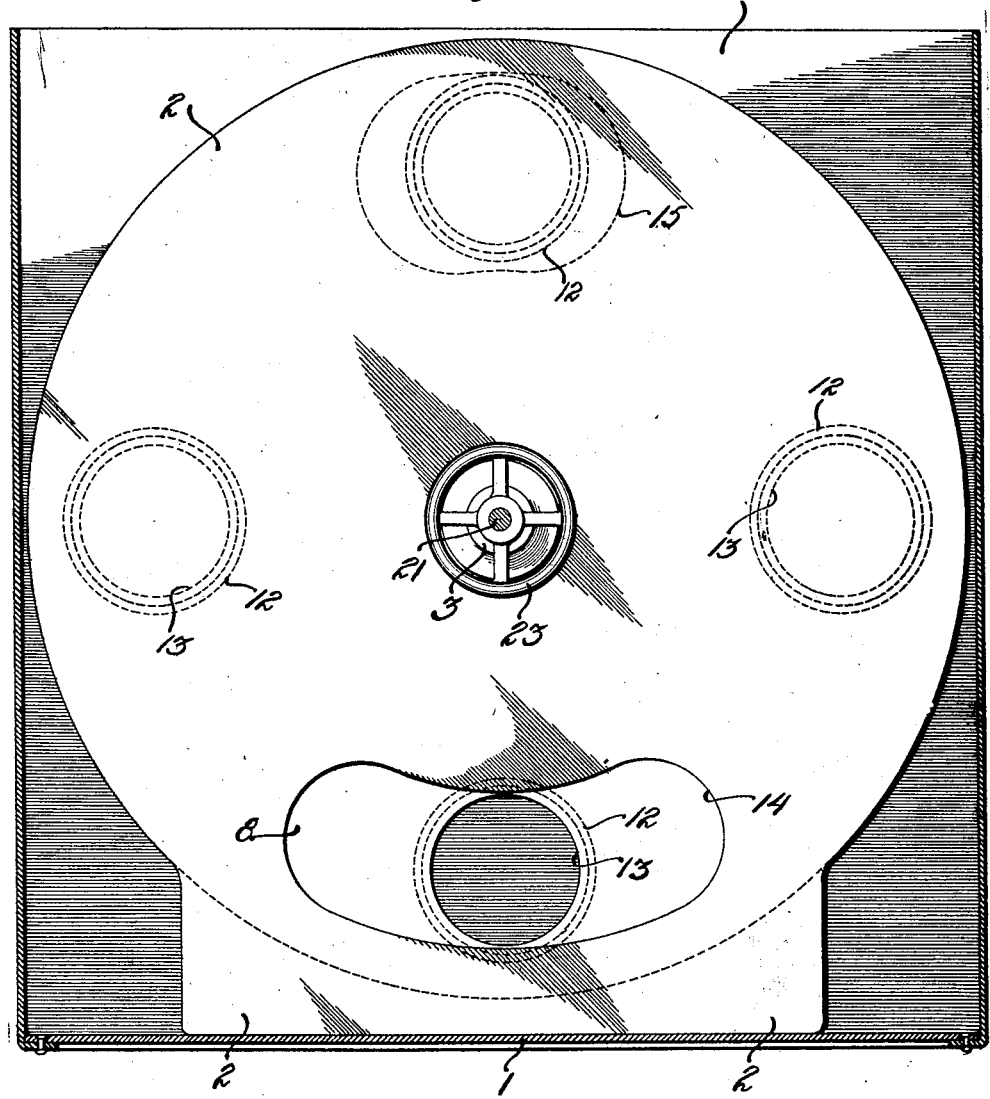

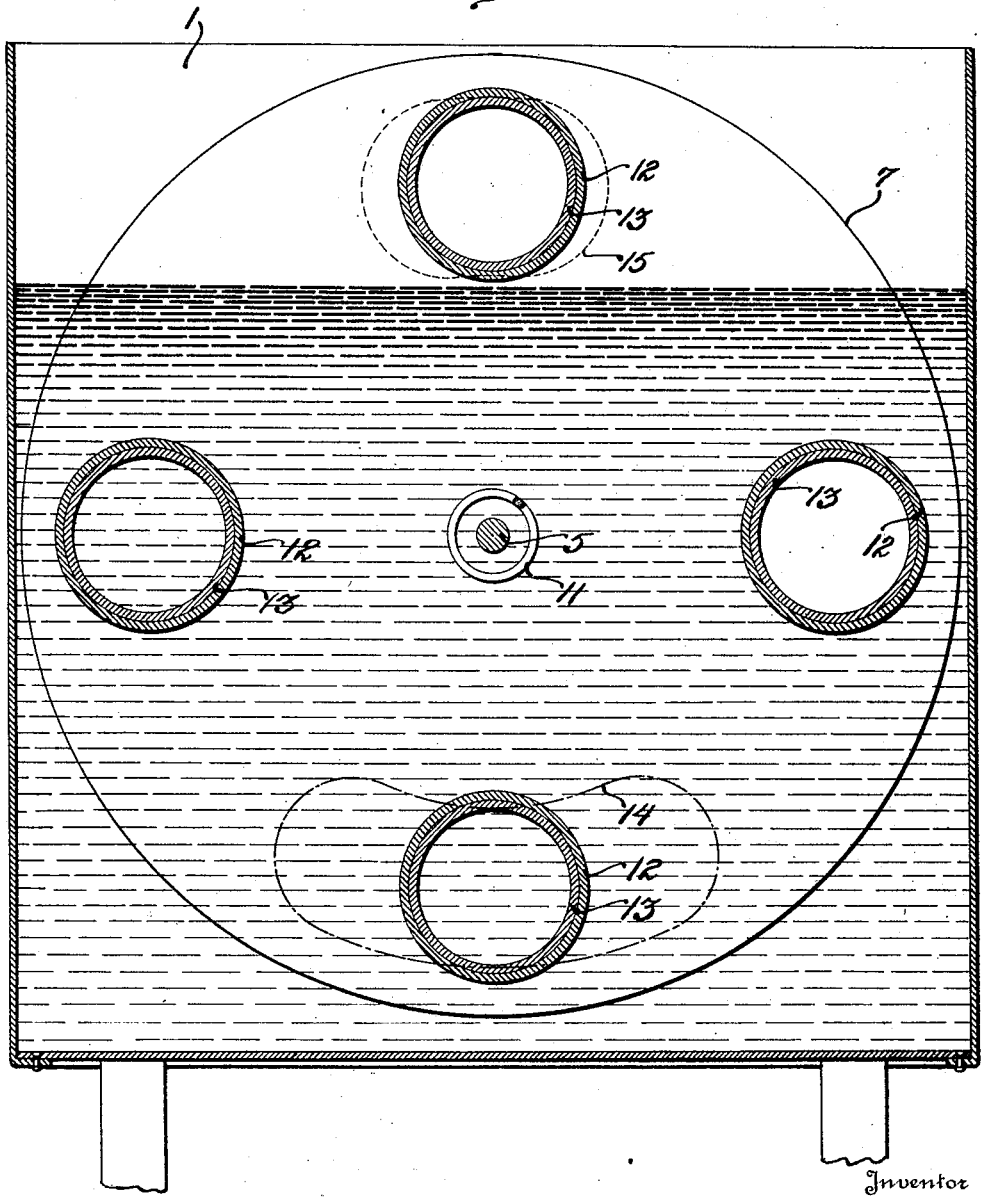

1,480,337

UNITED STATES PATENT OFFICE.

CHARLES H. AYARS, OF SALEM, NEW JERSEY, ASSIGNOR TO AYARS MACHINE COMPANY, OF SALEM, NEW JERSEY.

CAN-FILLING MACHINE.

Application filed March 3, 1923. Serial No. 622,662.

*To all whom it may concern:*

Be it known that I, CHARLES H. AYARS, a citizen of the United States, residing at Salem, in the county of Salem and State of New Jersey, have invented certain new and useful Improvements in Can-Filling Machines, of which the following is a specification.

My invention relates to can filling machines and more particularly to apparatus for measuring and feeding brine or other liquids to the cans, and the objects of my invention are to provide apparatus which will measure the liquid more accurately and feed it to the cans with less waste than the apparatus heretofore in use, and to provide efficient apparatus for this purpose which is simple, light, economical and durable.

These objects, and other advantageous ends which will be described hereinafter, I attain in the following manner, reference being had to the accompanying drawings in which—

Figure 1 is a vertical central section, with some of the working parts in elevation, of a liquid filling apparatus embodying my invention, Figure 2 a vertical section of the same on the line 2—2 of Figure 1, and Figure 3 a like section on the line 3—3 of Figure 1.

Referring to the drawings, 1 indicates a tank preferably of sheet metal and shown as of rectangular shape and 2 a vertically disposed plate supported in and adjustable horizontally in the tank. As shown, plate 2 is supported on the bottom of the tank and carries a collar 3, having a bore 4 providing a slidable bearing for a horizontally disposed shaft 5 which has a stationary bearing 6 in one of the side walls of the tank. Two circular plates 7 and 8 carried on hubs 9 and 10, splined to shaft 5, are mounted to rotate between the movable plate 2 and one wall of the tank and are held in contact respectively with the movable plate and said wall by a coiled spring 11. Plate 7 is provided with a series of sleeves 12 having open ends and extending horizontally. Plate 8 is provided with a like series of sleeves 13 but of smaller diameter to permit them to telescope within sleeves 12. Plates 7 and 8 with their sleeves 12 and 13 constitute the measuring wheel and each pair of telescoping sleeves constitutes a measuring receptacle.

The movable plate closes the inner end of the measuring receptacles during the upper part of their rotary movement and, in the form shown, is provided with an opening 14 adapted to register with said inner end at the low point of its rotary movement. A side wall of the tank closes the outer end of the measuring receptacles during the lower part of their rotary movement but is provided with a discharge opening 15 which registers with the outer end of a measuring receptacle as it reaches the upper part of its rotary movement. A conduit 16 leads from discharge opening 15 through which the contents of the measuring receptacle may pass to one of a series of funnels 17 carried by a distributing wheel, not shown, and be discharged into the cans.

A gear wheel 18 is fixed to the outer end of shaft 5 and meshes with a gear 19 on a shaft 20 through which rotary motion may be imparted to shaft 5 and the measuring wheel.

Collar 3 has a threaded bore at its outer end adapted to receive one end of a threaded shaft 21 which has a fixed bearing in a collar 22 secured to the wall of the tank. A hand wheel is fixed to shaft 21 for convenience in actuating the shaft.

The operation is as follows: The measuring wheels are adjusted to the desired capacity by rotating hand wheel 23 and screw shaft 21 thereby moving collar 4 and plate 2 in or out. If the movement is inward plate 8 moves with plate 2 against the pressure of spring 11. If the movement is outward plate 8 follows plate 2 owing to the pressure of spring 11. When the sleeves are so adjusted that the measuring receptacles will hold only the required quantity, the tank having been filled to the desired level, rotation is imparted to shaft 11 and thereby to the measuring wheel. Each measuring receptacle will then be filled as it reaches its low point of travel and the measured quantity of liquid will be discharged, as the receptacle reaches its high point of travel, into conduit 16 and through funnel 17 into the cans.

The level of the liquid in the tank is preferably maintained at a line but slightly below the discharge opening, as indicated in Figure 3, consequently the measuring receptacle has a very small distance to travel after it leaves the liquid in which it has been immersed before reaching the discharge and the danger of leakage is reduced to the minimum.

The tank and measuring wheels may be constructed of sheet metal which require no machining and a large part of the expense involved in the construction of the liquid measuring and feeding apparatus heretofore used is avoided.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. Liquid measuring apparatus including a tank having a discharge opening; a measuring wheel mounted to rotate therein in a vertical plane and consisting of sections having corresponding series of telescoping sleeves with open ends; means for closing one end of the sleeves in the upper arc of rotation of the measuring wheel; means for closing the other end of the sleeves during said upper arc of rotation, except when in registry with the discharge opening; means for adjusting the wheel sections relatively to each other to vary the capacity of the sleeves, and means for imparting rotation to the measuring wheel.

2. Liquid measuring apparatus including a tank having a discharge opening; a shaft horizontally disposed in the tank; a measuring wheel mounted on the shaft and consisting of sections having corresponding series of sleeves with open ends; means for closing one end of the sleeves during the upper arc of rotation of the measuring wheels except when in registry with the discharge opening; a movable plate closing the other end of the sleeves during said upper arc of rotation; a shaft having a threaded connection with the movable plate, and means for actuating the shaft for adjusting the position of the plate and one section of the measuring wheel relatively to the other section.

3. Liquid measuring apparatus including a tank having a discharge opening; a shaft horizontally disposed in the tank; a measuring wheel mounted on the shaft and consisting of sections having corresponding series of sleeves with open ends; means for closing one end of the sleeves during the upper arc of rotation of the measuring wheels except when in registry with the discharge opening; a movable plate closing the other end of the sleeves during said upper arc of rotation; a spring holding the wheel sections in contact with the closing means, and means for adjusting the wheel sections relatively to each other.

In testimony whereof I have signed my name to this specification in the presence of two subscribing witnesses.

CHARLES H. AYARS.

Witnesses:
CHAS. E. POTTS,
ELIZABETH GARBE.